(12) United States Patent
Vieira

(10) Patent No.: US 10,857,926 B1
(45) Date of Patent: Dec. 8, 2020

(54) FRONT PUSH COLLAPSIBLE PIVOTING CONTAINER AND FRAME WITH WHEELS

(71) Applicant: Paul Vieira, Methuen, MA (US)

(72) Inventor: Paul Vieira, Methuen, MA (US)

( * ) Notice: Subject to any disclaimer, the term of this patent is extended or adjusted under 35 U.S.C. 154(b) by 194 days.

(21) Appl. No.: 16/040,895

(22) Filed: Jul. 20, 2018

(51) Int. Cl.
| | | |
|---|---|---|
| *B60P 1/64* | (2006.01) | |
| *B62D 63/06* | (2006.01) | |
| *B60D 1/54* | (2006.01) | |

(52) U.S. Cl.
CPC .............. *B60P 1/6427* (2013.01); *B60D 1/54* (2013.01); *B60P 1/649* (2013.01); *B62D 63/065* (2013.01)

(58) Field of Classification Search
CPC .......... B62B 5/0016; B62B 5/002; B62B 1/16
USPC ................................... 280/33.992, 65, 304.1
See application file for complete search history.

(56) References Cited

U.S. PATENT DOCUMENTS

| | | | | | |
|---|---|---|---|---|---|
| 2,770,491 | A | * | 11/1956 | Perko ........................ | B62B 1/24 298/10 |
| 2,852,304 | A | * | 9/1958 | Harrison ................... | B62B 1/24 298/3 |
| 2,895,238 | A | * | 7/1959 | Long ........................ | B62B 1/147 37/434 |
| 3,160,439 | A | * | 12/1964 | Kazakowitz .............. | B62B 1/24 298/2 |
| 3,792,875 | A | * | 2/1974 | Paden ................... | B62K 27/003 280/204 |
| 3,877,723 | A | * | 4/1975 | Fahey ....................... | B62B 1/18 280/204 |
| 4,270,786 | A | * | 6/1981 | Mattox ..................... | B62B 1/24 280/47.32 |
| 4,305,601 | A | * | 12/1981 | Berge ....................... | A61G 5/10 280/304.1 |
| 4,484,755 | A | * | 11/1984 | Houston .................. | A61G 5/10 280/304.1 |
| 4,504,073 | A | * | 3/1985 | Isaacs ....................... | B62B 3/00 280/33.992 |
| 4,632,461 | A | * | 12/1986 | Randolph ................. | B62B 1/16 280/47.12 |
| 5,316,248 | A | * | 5/1994 | Allen ........................ | B62B 1/16 248/129 |
| 5,658,002 | A | * | 8/1997 | Szot ......................... | A61G 5/10 280/304.1 |
| 5,769,440 | A | * | 6/1998 | Jones ........................ | A61G 5/10 280/204 |
| 5,788,135 | A | | 8/1998 | Janek | |

(Continued)

OTHER PUBLICATIONS

Read, J.M., Clamp for Crimping Leather, U.S. Pat. No. 2,006, Mar. 16, 1841, 2 pages.

(Continued)

*Primary Examiner* — Jeffrey J Restifo
(74) *Attorney, Agent, or Firm* — Ference & Associates LLC

(57) ABSTRACT

A front push collapsible pivoting container and frame with wheels is provided. One aspect provides a front mount trailer assembly, including, but not limited to, a frame having a pivot at a top surface in a first end of the frame; a pair of vertical supports perpendicularly coupled at a second end of the frame; a pair of casting wheels attached to a bottom surface at the first end of the frame; and a container disposed over the frame, wherein a center bottom of the container is connected to the pivot of the frame. Other aspects are described and claimed.

10 Claims, 5 Drawing Sheets

(56) References Cited

U.S. PATENT DOCUMENTS

| | | | |
|---|---|---|---|
| 5,794,957 A * | 8/1998 | Mendon | A61G 5/10 280/204 |
| 5,927,730 A * | 7/1999 | Sattler | B62B 5/002 280/47.131 |
| 5,938,395 A | 8/1999 | Dumont, Jr. | |
| 6,155,648 A | 12/2000 | Dombek et al. | |
| 6,186,528 B1 * | 2/2001 | Walker, Sr. | A61G 5/10 280/204 |
| 6,193,256 B1 * | 2/2001 | Banary, Jr. | B62D 59/00 224/413 |
| 6,193,319 B1 * | 2/2001 | Kielinski | B62B 1/16 280/47.12 |
| 6,422,634 B2 * | 7/2002 | Lundh | B62B 9/28 280/32.7 |
| 6,502,669 B1 * | 1/2003 | Harris | B60B 33/0007 16/35 R |
| 6,698,772 B1 * | 3/2004 | Cervantes | B62B 9/28 280/33.992 |
| 6,702,313 B2 * | 3/2004 | Forshee | A61G 5/10 280/304.1 |
| 6,767,025 B2 * | 7/2004 | Hagen | B62D 63/061 280/401 |
| 6,979,058 B1 * | 12/2005 | Beaty | A47K 3/282 248/219.1 |
| 7,055,848 B1 * | 6/2006 | James | B62D 63/061 280/401 |
| 7,472,917 B2 * | 1/2009 | Loudon | B60D 1/00 280/292 |
| 7,641,285 B2 | 1/2010 | Jacobs | |
| 7,699,128 B1 * | 4/2010 | Strauss | B62B 5/0026 180/23 |
| 7,703,795 B2 * | 4/2010 | Williamson | A01K 97/10 280/40 |
| 7,871,088 B2 * | 1/2011 | Silva | B62B 5/002 135/66 |
| 7,937,859 B2 * | 5/2011 | Downes | B62B 1/16 294/176 |
| 7,967,174 B2 * | 6/2011 | Lauber | A61G 5/10 224/407 |
| 8,029,007 B2 * | 10/2011 | Jones | B62D 63/00 280/204 |
| 8,087,683 B2 * | 1/2012 | James | B62B 1/008 280/204 |
| 8,376,381 B2 * | 2/2013 | Shalaby | B62B 3/12 280/204 |
| 8,376,391 B2 * | 2/2013 | Voves | B62B 1/12 280/47.26 |
| 8,414,052 B2 | 4/2013 | Vertanen | |
| 8,448,978 B2 * | 5/2013 | Alvarino | B62D 63/061 280/638 |
| 8,505,932 B1 * | 8/2013 | Piccirillo | B62B 5/0003 280/30 |
| 8,794,655 B1 * | 8/2014 | Gipson | B62B 1/008 280/304.1 |
| 8,820,774 B2 * | 9/2014 | Schonhardt | B62B 1/12 280/47.18 |
| 8,857,848 B2 * | 10/2014 | Lomas | B62D 63/061 224/153 |
| 8,967,651 B1 * | 3/2015 | Simic | B62K 27/003 280/204 |
| 9,033,355 B2 * | 5/2015 | Lin | B62K 27/00 280/204 |
| 9,980,874 B2 * | 5/2018 | Donahue | A61H 3/04 |
| 10,246,113 B2 * | 4/2019 | Bresnahan, Sr. | B62B 5/002 |
| 10,576,001 B1 * | 3/2020 | Makins | A61G 5/1094 |
| 2015/0117994 A1 | 4/2015 | Defrancq | |

OTHER PUBLICATIONS

Varnum, George W., Centering Tool, U.S. Pat. No. 311,619, Feb. 3, 1885, 2 pages.

* cited by examiner

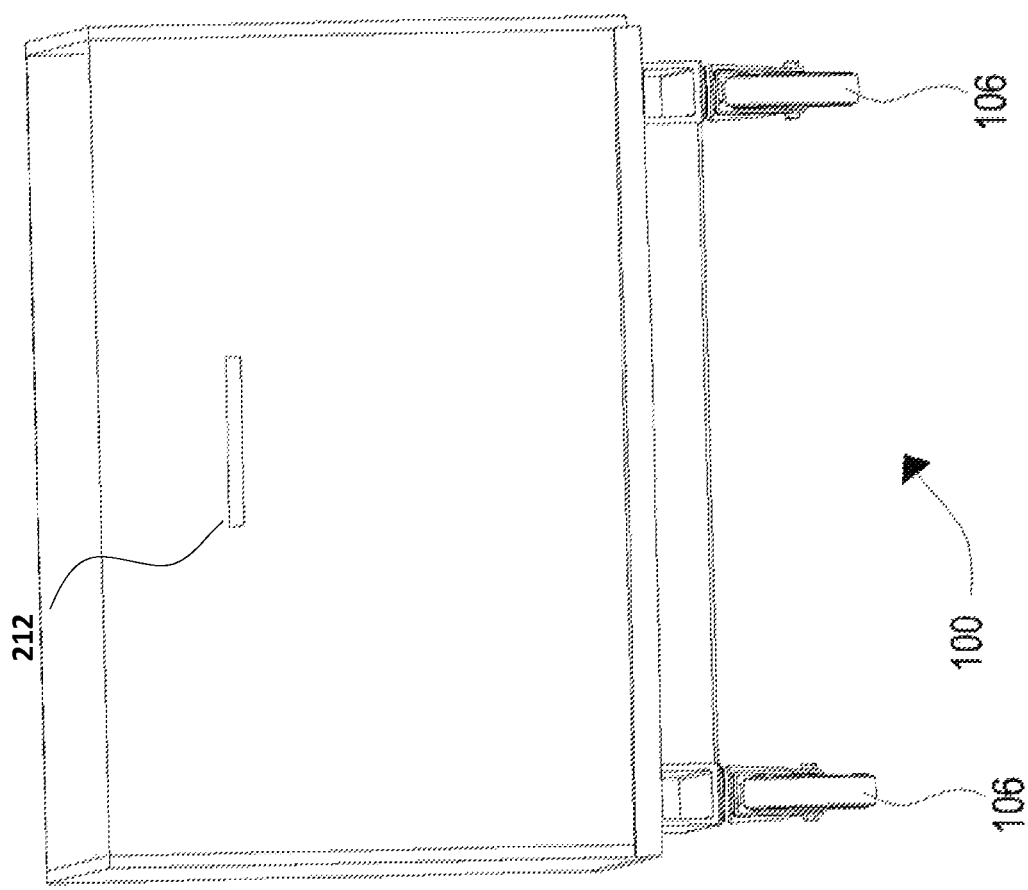

FRONT PUSH COLLAPSIBLE PIVOTING CONTAINER AND FRAME WITH WHEELS

BACKGROUND

Technical Field

Embodiments herein generally relate to trailers, and more particularly to a front mount trailer assembly for conveying materials from work areas.

Description of the Related Art

During landscaping projects, materials such as mulch, soil, and decorative gravel and stone must be moved to a desired work area such as a flower bed or planting area. Conventionally, wheel barrows are used to convey such loads because the wheels and weigh distribution prevent damage to already planted or prepared areas but they are limited in capacity and require man power for loading, moving, and unloading. Lawn mowers (i.e., commercial or residential lawn mowers) or 4-wheelers pulling a trailer have also been used. However, the trailer wheels may slide through, jackknife, or flip or turn over unintentionally, while being pulled by the lawn mower or 4-wheeler.

Accordingly, there is a need for a more efficient and less damaging means for conveying large quantities of materials though an existing grass or planted area to a work area.

SUMMARY

In view of forgoing embodiment, an embodiment herein provides: a front mount trailer assembly, comprising: a frame having a pivot at a top surface in a first end of the frame; a pair of vertical supports perpendicularly coupled at a second end of the frame; a pair of casting wheels attached to a bottom surface at the first end of the frame; and a container disposed over the frame, wherein a center bottom of the container is connected to the pivot of the frame.

Another embodiment provides: a front mount trailer assembly, comprising: a rectangular frame having a pivot at a top surface in a first end of the rectangular frame; a pair of vertical supports perpendicularly coupled at a second end of the rectangular frame; a pair of casting wheels attached to a bottom surface at the first end of the rectangular frame; and a container disposed over the rectangular frame, wherein a center bottom of the container is connected to the pivot of the rectangular frame, wherein a front and back wall of the container are rectangular walls and side walls of the container are rectangular walls having one angular end.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2A-C illustrate different views of the front mount trailer assembly 100 according to an embodiment herein.

DETAILED DESCRIPTION OF PREFERRED EMBODIMENTS

Figure 1:
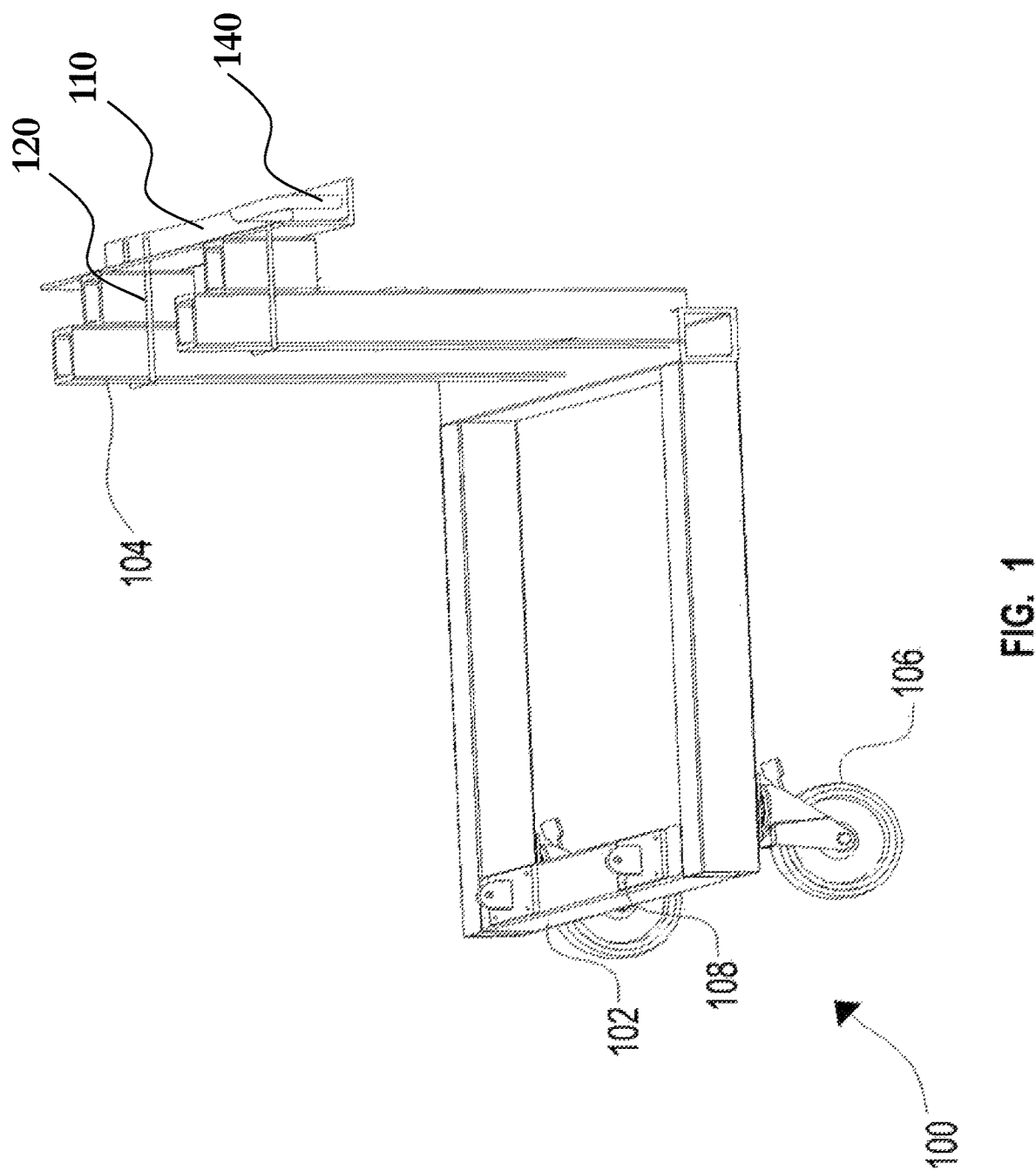
FIG. 1 illustrates a rectangular frame for a front mount trailer assembly according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Commercial landscaping requires moving large quantities of materials such as mulch, decorative stone, gravel, and top soil and the like. Conventionally, in order to prevent damage to expensive sod and other fragile landscaping, wheel barrows are utilized. The wheel barrows have one or more wheels and distribute weight to prevent damage as laborers push them with heavy material in them. However, wheel barrows are limited in capacity and may take many man hours to move multiple loads.

Accordingly, the inventor has created a system comprising a rectangular light weight container that is collapsible, seated on a support frame with two wheels, each of the vertical shafts (wheel pins) of the wheel assembly for each of the two wheels intersect the pivot point of the container and frame. The container may hold approximately 4 wheelbarrow loads of materials and is rigidly connected in the back to the front of a lawn mower such that the lawn mower pushes the frame holding the container.

The inventor has discovered that by placing air-filed inflatable landscaping casting wheels (with 360 degree movement) on the support frame and rigidly attaching the support frame to the front of a lawn mower (i.e., commercial or residential lawn mower) or 4 wheeler vehicle, or the like, the landscaping casting wheels will automatically turn in the direction that the lawn mower wheels are turned. This arrangement provides easy movement without dragging the wheels through fragile and delicate grassy areas that might surround landscaping and flower beds. Because the landscaping wheels are inflatable and air-filled they distribute the weight of the load without digging into the earth or landscaping below.

To provide an easy pivoting motion to dump materials from the container, the container is positioned to create a fulcrum and lever action at the pivot point. In a preferred embodiment of placement of the container on the frame, the container is seated such that it is moved back 20" on the frame and 16" overhanging off the frame. This means that when the frame and container are pushed about 16" into a flower bed (work area), the wheels are still in the solid area so the container extends into and unloads right into the work area without damaging the soft and fragile portions of the work area. Once positioned as desired, the front facing short side of the container may be moved upward, and the container unlocked from the frame and easily tipped forward at the pivot point to allow the material in the container to be dispensed to the desired work area.

Referring now to the drawings, and more particularly to FIGS. 1 through 2C, where similar reference characters denote corresponding features consistently throughout the figures, there are shown preferred embodiments.

FIG. 1 illustrates a rectangular frame 102 for a front mount trailer assembly 100 according to an embodiment herein. The front mount trailer assembly 100 includes the rectangular frame 102, a pair of vertical supports 104, and a pair of casting wheels 106. The rectangular frame 102 has a pivot 108 at a top surface in a first end of the rectangular frame 102. The pair of vertical supports 104 are attached perpendicularly coupled at a second end of the rectangular frame 102. The pair of casting wheels 106 is attached to a bottom surface at the first end of the rectangular frame 102. The casting wheels 106 are rotationally affixed to the rectangular frame and are each capable of rotating 360 degrees around the vertical shaft of the wheel. The front mount trailer assembly 100 further includes a horizontal rod assembly 110 that may be adjustably attached to the front of a lawn mower or 4 wheeler vehicle or the like using threaded U-bolts 120 and nuts (not shown in this Figure) to the pair of vertical supports 104 for coupling with a front mount lawn mower or 4 wheeler vehicle. Likewise, U-Bolt 140 may be raised and lowered by loosening and tightening bolts on its threaded end such that additional attachment points such that the U-Bolt may be aligned to accomplish additional and desired attachment points for the lawn mower or 4-wheel vehicle or the like.

The pair of casting wheels 106 includes a rod and hinge that is connected to top of each of the pair of casting wheels 106. The rod is passed through the rectangular frame 102 and locked by a locking pin that is passed vertically through a hole at the top of the rod as the rod exits the rectangular frame. Once the locking pin is inserted, the rod on the top of the casting wheel is secured to the rectangular frame until the pin is removed.

In one embodiment, the rod includes multiple spacers, and one hole that is adapted to receive the locking pin. In another embodiment, the height of the pair of casting wheels 106 is changed by adding or removing spacers to the rod on the top of the casting wheel before the hole adapted to receive the locking pin.

Figure 2A:
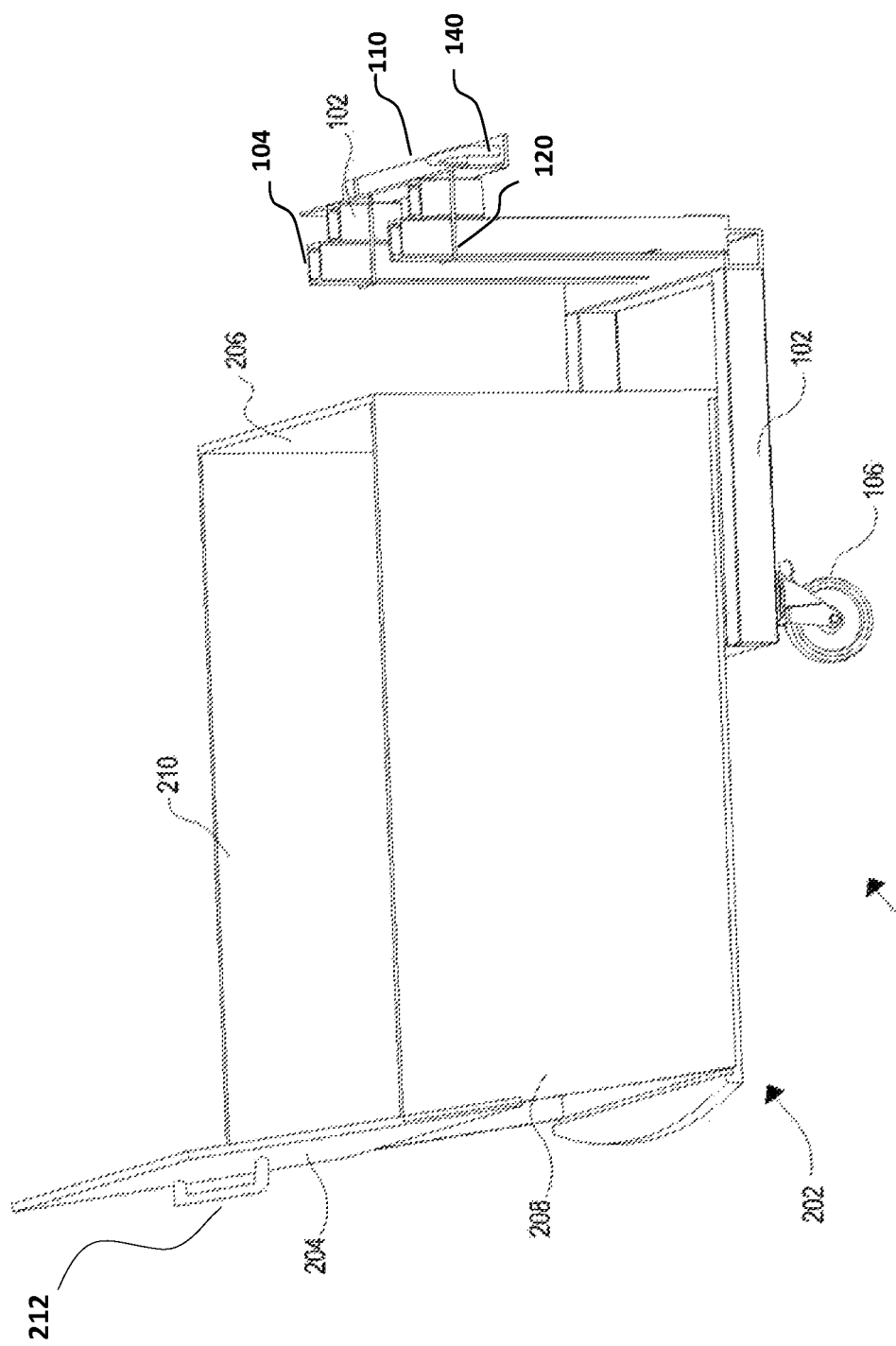
Figure 2B:
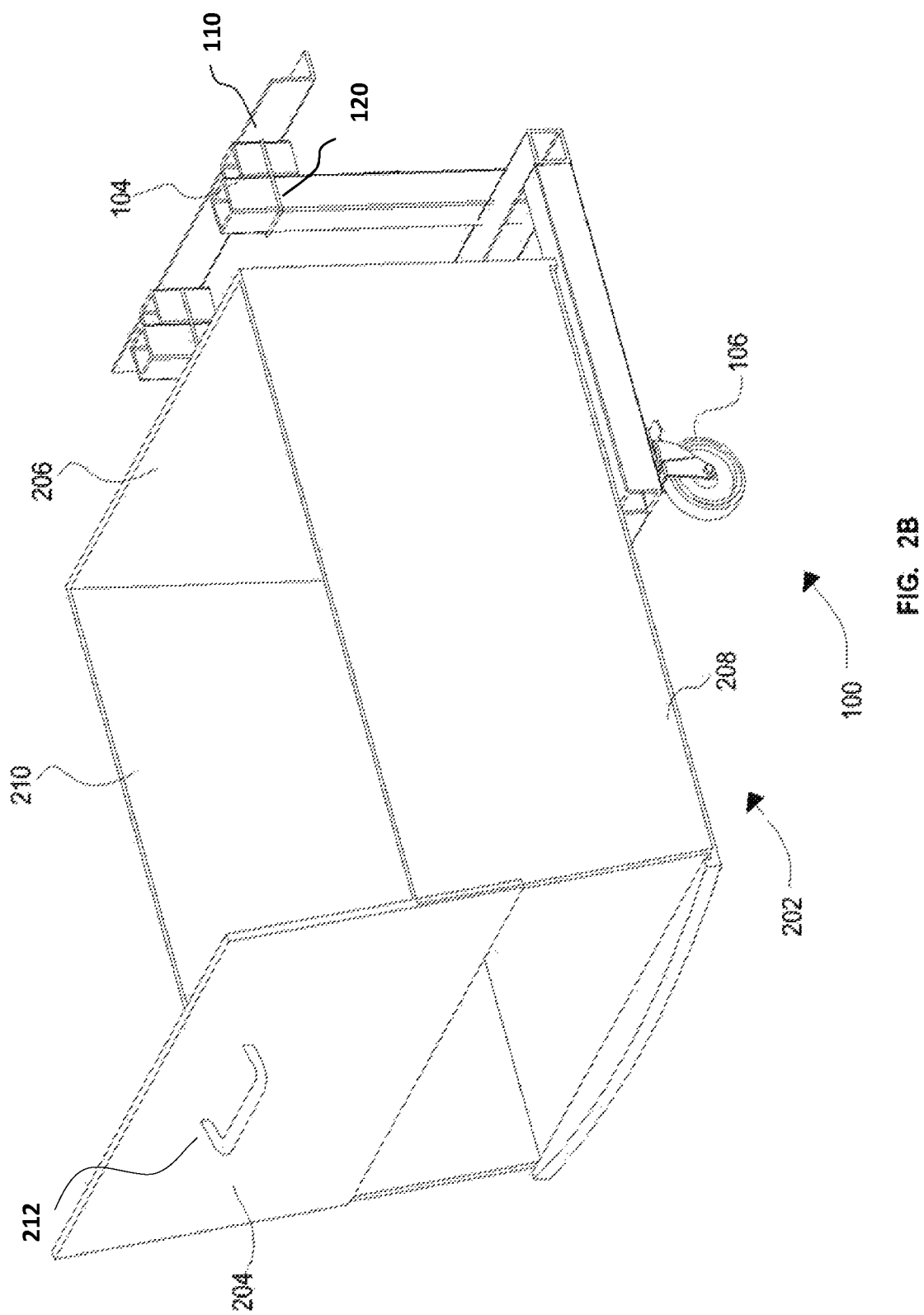

FIGS. 2A-C illustrate different views of the front mount trailer assembly 100 according to an embodiment herein. In one example, FIGS. 2A-B illustrate a perspective view of the front mount trailer assembly 100. FIG. 2C illustrates a front view of the front mount trailer assembly 100. The front mount trailer assembly 100 further includes a container 202 that is supported, in part, by the rectangular frame 102. In one embodiment, a center bottom of the container 202 is connected to the pivot 108 of the rectangular frame 102. The container 202 includes a front wall 204, a back wall 206, a left side wall 208 and a right side wall 210. In one embodiment, the front wall 204 and back wall 206 of the container 202 are rectangular walls. In another embodiment, the left side wall 208 and right side wall 210 of the container 202 are rectangular walls. In another embodiment, first ends of the left side wall 208 and right side wall 210 is angular. In one embodiment, second ends of the left side wall 208 and right side wall 210 are coupled with the back wall 208.

The first ends of the left side wall 208 and right side wall 210 include a sliding groove that is adapted to receive the front wall 204. In other words, the front wall 204 is adapted to slide over the sliding groove of the left side wall 208 and right side wall 210. Handle 212 may be affixed to front wall 204. The pivot 108 is adapted to tilt the container 202 for unloading materials from the container 202. By gripping and pulling up on handle 212, the front wall 204 may be slid upwards and the container may be tilted at the pivot 108 to unload the materials from the container 202. In one embodiment, the front mount trailer assembly 100 is approximately 36 inches long and approximately 26 inches wide. In another embodiment, the container 202 comprises plastic materials. In at least one preferred embodiment, the rectangular frame 102, and the pair of vertical supports 104 comprise steel. In other embodiments, rectangular frame 102 and the pair of vertical supports 104 may comprise other tool strength types of material as desired.

Figure 3:
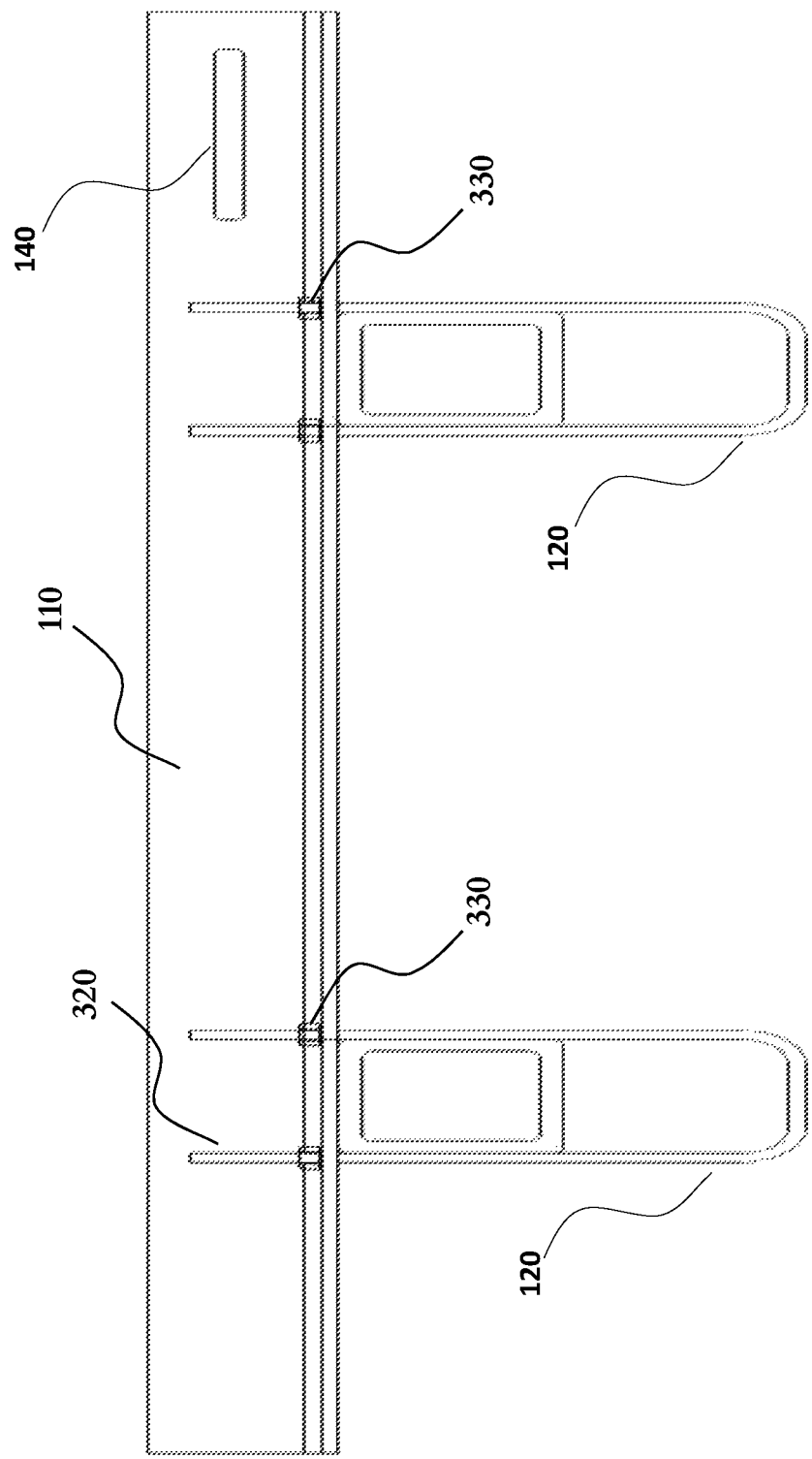
FIG. 3 illustrates a horizontal rod assembly of a front mount trailer assembly according to an embodiment herein.

FIG. 3 illustrates a horizontal rod assembly 110 of a front mount trailer assembly 100 according to an embodiment herein. By loosening and tightening nut 330 on threaded end 320 of U-bolt 120, front mount trailer assembly may be adjusted up and down on vertical support 104 to achieve the desired attachment height and contact points for a lawn mower, 4-wheeler, and the like. A similar adjustment may be accomplished using U-bolt 140, having threaded ends (not shown) and nuts (not shown), which may also be adjustably attached to horizontal rod assembly 100 to permit desired adjustment for fastening to the front of a lawn mower, 4-wheeler, and the like.

At least one embodiment provides for a front mount trailer assembly, comprising: a frame having a pivot at a top surface in a first end of the frame; a pair of vertical supports perpendicularly coupled at a second end of the frame; a pair of casting wheels attached to a bottom surface at the first end of the frame; and a container disposed over the frame, wherein a center bottom of the container is connected to the pivot of the frame.

Optionally, a rubber gasket (or similar flexible material spacer) may be fitted between the vertical surfaces of contact and/or horizontal surfaces of contact between the horizontal rod assembly 110 and the attachment points of the lawn mower, 4-wheeler, and the like. In this way, the contact points (and the operator of the lawn mower, 4-wheeler, and the like) are buffered from shock and bumps as is generally the front mount trailer assembly 100 and the lawn mower, 4-wheeler and the like.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A front mount trailer assembly, comprising:
a rectangular frame having a pivot at a top surface in a first end of the rectangular frame;
a pair of vertical supports perpendicularly coupled at a second end of the rectangular frame;
a pair of casting wheels attached to a bottom surface at the first end of the rectangular frame; and a container disposed over the rectangular frame, wherein a center bottom of the container is connected to the pivot of the rectangular frame, wherein a front and back wall of the container are rectangular walls and side walls of the container are rectangular walls having one angular end;

wherein the rectangular walls that have an angular side comprise a handle and a sliding groove; and wherein the front rectangular wall is adapted to slide over the sliding groove provided on the rectangular side walls.

2. The front mount trailer assembly of claim 1, wherein the pivot is adapted to tilt the container for unloading materials from the container.

3. The front mount trailer assembly of claim 1, wherein a horizontal rod is attached to the pair of vertical supports for coupling with a front mount tractor.

4. The front mount trailer assembly of claim 1, wherein a rod of the pair of casting wheels is passed through the rectangular frame and locked by a locking pin.

5. The front mount trailer assembly of claim 4, wherein a height of the pair of casting wheels is adjusted by adding or removing spacers on each of the rods of the pair of casting wheels.

6. A front mount trailer assembly, comprising:
a rectangular frame having a pivot at a top surface in a first end of the rectangular frame;
a pair of vertical supports perpendicularly coupled at a second end of the rectangular frame;
a pair of casting wheels attached to a bottom surface at the first end of the rectangular frame; and
a container disposed over the rectangular frame, wherein a center bottom of the container is connected to the pivot of the rectangular frame, wherein a front and back wall of the container are rectangular walls and side walls of the container are rectangular walls having one angular end;

wherein the rectangular walls having an angular side comprise a sliding groove;

wherein the front wall is adapted to slide over the sliding groove provided on the side walls; and wherein the front wall comprises a handle.

7. The front mount trailer assembly of claim 6, wherein the pivot is adapted to tilt the container for unloading materials from the container.

8. The front mount trailer assembly of claim 7, wherein a horizontal rod is attached to the pair of vertical supports for coupling with a front mount tractor.

9. The front mount trailer assembly of claim 6, wherein a rod of the pair of casting wheels is passed through the rectangular frame and locked by a locking pin.

10. The front mount trailer assembly of claim 9, wherein a height of the pair of casting wheels is adjusted by adding or removing spacers on each of the rods of the pair of casting wheels.

* * * * *